United States Patent [19]

Lang

[11] Patent Number: 5,099,967
[45] Date of Patent: Mar. 31, 1992

[54] DRUM BRAKE ASSEMBLY

[75] Inventor: Allan M. Lang, Dewsbury, Great Britain

[73] Assignee: BBA Group Plc., West Yorkshire, Great Britain

[21] Appl. No.: 376,831

[22] Filed: Jul. 7, 1989

[30] Foreign Application Priority Data

Jul. 16, 1988 [GB] United Kingdom ............... 8817007

[51] Int. Cl.⁵ ...................... F16D 51/24; F16D 51/30
[52] U.S. Cl. ............................... 188/328; 188/205 A; 188/217; 188/250 F; 188/334; 188/341; 192/30 V
[58] Field of Search ............... 188/341, 334, 205 A, 188/328, 216, 217, 73.36, 73.37, 327, 250 F; 192/30 V

[56] References Cited

U.S. PATENT DOCUMENTS 2,102,851 12/1937 La Brie ....................... 188/341 X
3,782,509 1/1974 Cook ....................... 188/73.36 X

FOREIGN PATENT DOCUMENTS

| 968196 | 1/1958 | Fed. Rep. of Germany ...... 188/334 |
| 2250742 | 4/1974 | Fed. Rep. of Germany ... 188/73.36 |
| 1497559 | 9/1967 | France ............................ 188/341 |
| 124162 | 9/1979 | Japan ............................ 188/73.37 |
| 47536 | 3/1984 | Japan ............................ 188/73.37 |
| 1366446 | 9/1974 | United Kingdom ............ 188/73.36 |

Primary Examiner—George E. A. Halvosa

[57] ABSTRACT

A drum brake assembly has brake shoes 2 and 3 within a rotatable drum 1. The shoes 2 and 3 are displaceable to effect braking by an hydraulic ram 7 and free ends 9 of the shoes react against an abutment 10. This reaction is effected through a layer of viscoelastic damping material and metal plate laminate 110 which may be carried by either the brake shoes or the abutment 10. The viscoelastic layer may be bonded between steel plates and secured by a spring clip to either the brake shoe or the abutment 10. Alternatively the viscoelastic layer may be bonded to the abutment 10. The laminate 110 can be accommodated within a recess in the abutment 10. The provision of the viscoelastic layers through which the brake shoes react on the abutment 10 alleviates the development of noise or squeal during use of the brake assembly.

13 Claims, 3 Drawing Sheets

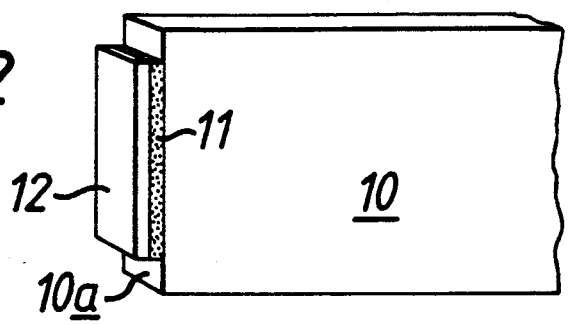
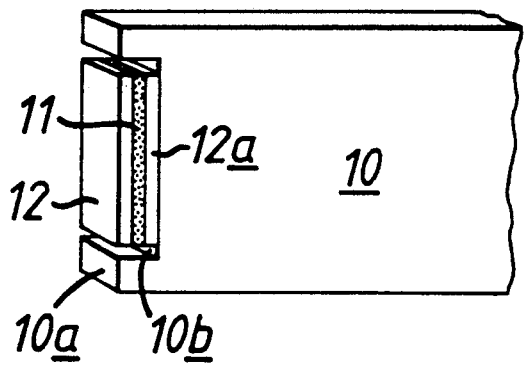
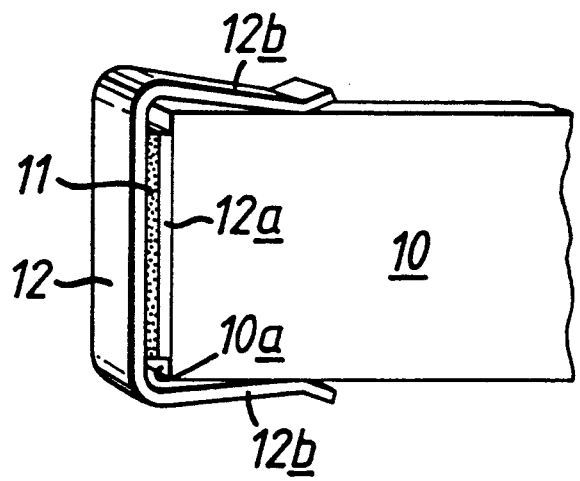
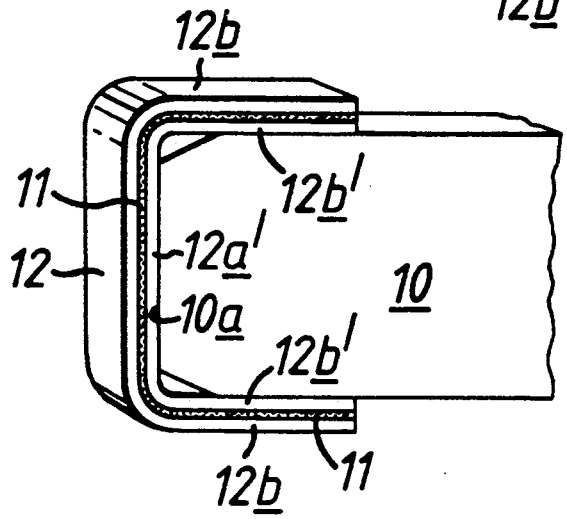

DRUM BRAKE ASSEMBLY

TECHNICAL FIELD AND BACKGROUND ART

The present invention relates to a drum brake assembly and is primarily concerned with srch assemblies as are known for vehicle braking and which have a rotatable brake drum within which is located a brake shoe. More particularly the invention concerns brake assemblies of the kind in which the shoe is displaceable into engagement with the interior cylindrical surface of the drum for braking purposes, for example by actuation of an hydraulic ram, and during braking a freely mounted end of shoe reacts by abutment against a plate on which that end pivots as the shoe is displaced. In practice the operation of a drum brake assembly of the kind referred to occasionally results in the development of vibrations producing noise or brake squeal. Such noise is generally regarded as disconcerting and unacceptable and it is an object of the present invention to provide a drum brake assemby of the kind referred to in which the development of noise during use of the assembly is alleviated.

STATEMENT OF INVENTION & ADVANTAGES

According to the present invention there is provided a drum brake assembly comprising a rotatable brake drum having an interior cylindrical surface; a brake shoe within the drum; actuating means for displacing the shoe into engagement with said cylindrical surface for braking the drum; said shoe having a free end remote from the actuating means and which end reacts during braking against an abutment relative to which the drum is rotatable, and wherein the free end of the shoe is in direct abutting and sliding contact with a plate which is interposed between said free end and the abutment, and interposed between said plate and the abutment is a resilient damping material through which said reaction is effected to alleviate noise of operation of the assembly Usually the actuating means for displacing the shoe will be a fluid pressure operated ram and will, for convenience, be considered as such hereinafter. Also it will be appreciated that the interior or cylindrical surface of the brake drum is not necessarily continuous.

In a conventional drum brake assembly of the kind specified the abutment is in the form of a steel plate, anvil or similar part against which the shoe reacts and this reaction is by direct metal-to-metal abutting contact between the shoe and the abutment. By the present invention however the reaction of the shoe against the abutment is through the medium of the resilient damping material and the introduction of a relatively thin layer of such a material has been found to result in a considerable reduction in the level of noise or squeal which is generated during operation of the brake assembly. The resilient damping material is preferably a layer of viscoelastic material (such as a natural or synthetic rubber) where it is believed that viscosity of the material absorbs energy to provide the required damping characteristics and the elasticity of the material maintains its structure and ensures that it will return to a predetermined form following temporary compression. A preferred example of the resilient damping material is the elastomeric material sold under the Trade Mark BUNA-N.

In conventional drum brake assemblies there are usually two brake shoes of generally arcuate shape positioned diametrically opposite to each other within the drum so that an hydraulic piston and cylinder ram can act simultaneously on both shoes at one common end of those shoes to apply the brake while the other common and free ends of the shoes can react against the abutment during operation of the brake. With such a conventional assembly there is what. is known in the art as a leading brake shoe and it is preferred that at least this leading brake shoe reacts against the abutment through the resilient damping material and plate combination—usually however, both brake shoes will react against the abutment through respective resilient damping material and plate combinations.

The resilient damping material is likely to be an extremely thin layer (say in the range 0.2 to 0.5 millimetres thickness) and may be carried either by the brake shoe or by the abutment. Conventionally the edge of a steel web on the brake shoe will be urged into direct abutment with a flat face of the abutment anvil or other part so it is likely to be more convenient to locate the resilient damping material so that it is retained on the flat face of the abutment rather than on the brake shoe web.

It is preferred that the resilient damping material is sandwiched between opposed metallic plates or faces and is bonded or adhesively secured to at least one of those plates or faces so that the shoe reacts against the abutment through the metal plate/damping material laminate. One of the opposed faces may be provided by the abutment plate, anvil or other part. Alternatively the laminate or combination formed by the layer of resilient damping material sandwiched between two metallic plates can be interposed as a unit between the brake shoe and the abutment. The unit as aforementioned may include retaining means such as a clip which engages with and firmly retains the unit in position on either the brake shoe or the abutment. Alternatively, or in addition, the unit can be accommodated within a recess of the abutment which ensures that the unit is appropriately retained in its operational position. The unit provided by a layer of the resilient damping material sandwiched between opposed metallic plates can form a relatively thin shim (typically each plate could have a thickness in the range 0.2 to 0.5 millimetres sandwiching a thin layer of damping material as aforementioned) so that the shim could be incorporated in existing drum brake assemblies of conventional form with very little or no modification being required to those assemblies.

Further according to the present invention there is provided a method of alleviating the development of noise in a drum brake assembly which comprises providing a resilient damping material and metal plate laminate between a free end of a brake shoe of the assembly and an abutment for said brake shoe so that the free end of the shoe is in direct abutting and sliding contact with the plate and the resilient damping material is interposed between the plate and the abutment whereby upon displacement of the brake shoe to brake the drum, the shoe reacts in response to said braking against the abutment successively through the plate and the medium of said resilient damping material.

DRAWINGS

Embodiments of drum brake assemblies constructed in accordance with the present invention will now be described, by way of example only, with reference to the accompanyin drawings, in which:

FIG. 1 diarammatically illustrates the general form of the drum brake assemblies and in particular the location of the resilient damping material in such an assembly which has a leading brake shoe and a trailing brake shoe;

FIGS. 2 to 5 show perspective views of four examples of different means by which the resilient damping material may be mounted on an abutment in the assembly of FIG. 1, and FIG. 6 shows a modified form of drum brake assembly having two leading brake shoes and the location of the resilient damping material.

DETAILED DESCRIPTION OF DRAWINGS

Figure 1:
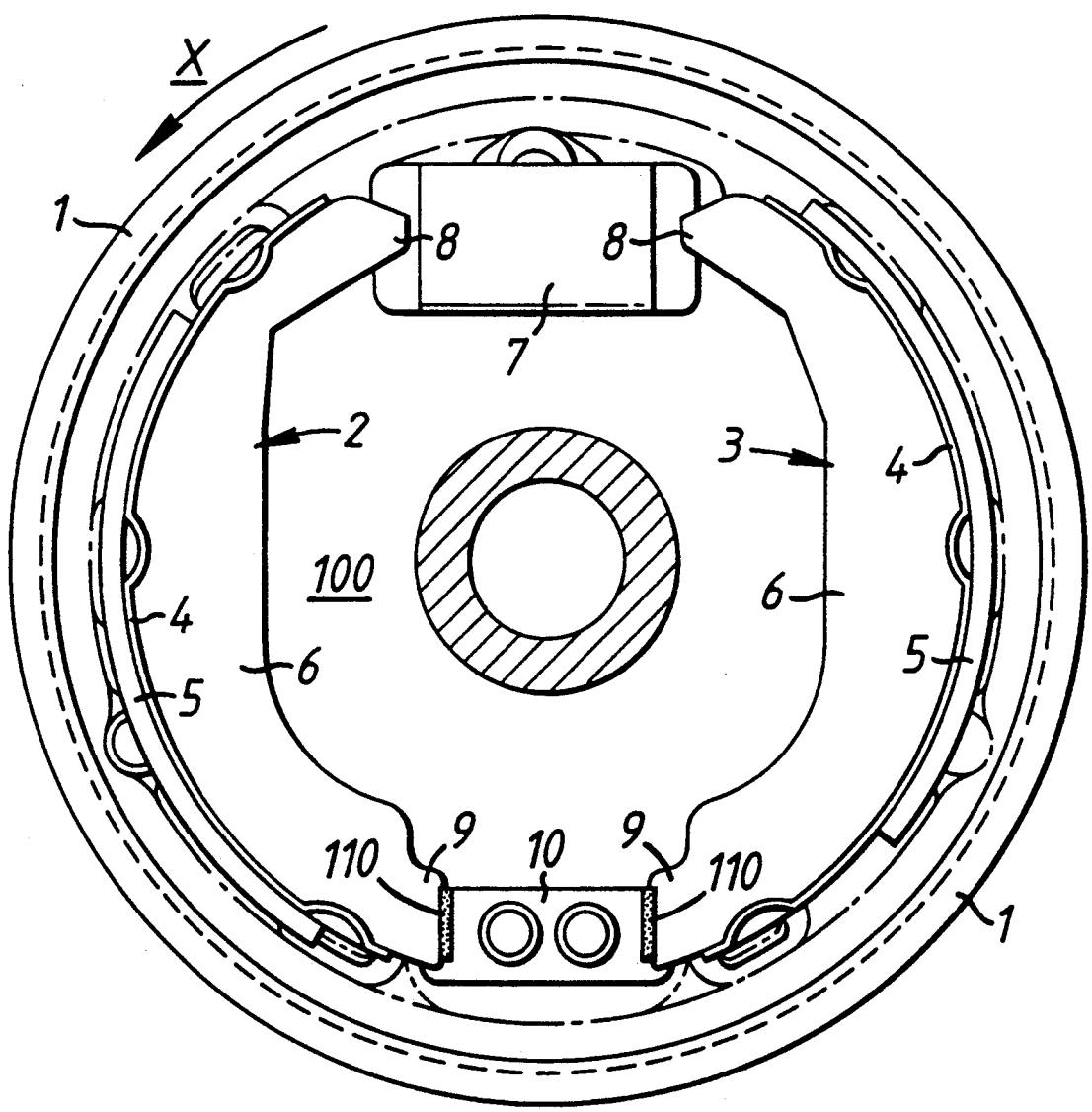

The components of the drum brake assembly shown in FIG. 1 will, in the main, be recognisable by those familiar with the present art as comprising a cylindrical drum 1 rotatable with a vehicle wheel and within which is mounted a pair of non-rotatable brake shoes 2 and 3. Each brake shoe has a generally arcuate form and comprises a substantially part-cylindrical steel platform 4 on the convex side of which is carried a friction braking material 5 while the concave side of the platform has an integral steel reinforcing web 6. The shoes 2 and 3 are positioned diametrically opposite to each other within the drum 1 and an hydraulic ram or piston and cylinder device 7 is disposed to act between one pair of adjacent common ends 8 of the webs 6. Disposed between the other pair of adjacent common free ends 9 of the webs 6 is an abutment in the form of a steel anvil or plate 10. The ram 7 and abutment 10 are non-rotatably secured to a back plate 100 of the assembly.

During use of the drum brake assembly in conventional manner the brake shoes 2 and 3 are displaced simultaneously radially outwardly in FIG. 1 by operation of the hydraulic ram 7 to move the braking material 5 into frictional engagement with the cylindrical interior wall of the drum 1 to brake the rotating drum. In response to the actuation of the ram 7 and the traking of the drum 1, the shoes 2 and 3 can react against and pivot on the abutment 10. In a conventional assembly this latter reaction would be by the edges of the free ends 9 of the steel webs 6 directly abutting and sliding on the anvil or the plate 10. By the present invention however a resilient damping material and plate laminate 11 is interposed between the free end 9 of each brake shoe and the abutment 10. Consequently each brake shoe can react against the abutment 10 through the medium of the resilient damping material and plate laminate 110 and it has been found that this alleviates the development of noise or squeal during operation of the assembly (such noise being believed to be attributable in part to vibration in the shoes).

FIGS. 2 to 5 illustrate ways in which resilient damping material consisting of a layer 11 of viscoelastic material (such as Nitrile Rubber) can be incorporated in the assembly of FIG. 1. For a typical brake assembly the layer 11 is likely to have a thickness in the order of 0.25 millimetres.

In the embodiment of FIG. 2 the layer of viscoelastic material 11 is sandwiched between a flat steel plate 12 and a flat end face 10a of the abutment 10. The layer 11 is bonded or adhesively secured to both the plate 12 and the face 10a to form a laminate which is located so that the free end 9 of the steel web 9 abuts and is slidable on the steel plate 12 to react against the abutment 10 through the layer 11. Typically the plate 12 will have a thickness in the order of 0.35 millimetres.

In the embodiment of FIG. 3 the layer 11 of viscoelastic material is sandwiched between a pair of similar flat steel plates 12 and 12a to which it is bonded to form a laminated shim. The laminated shim is accommodated within a recess 10b in the end face 10a of the abutment and is retained in the recess by side plates (not shown) on the abutment 10 and by the abutment of an end 9 of the brake shoe web against the plate 12 to react through that plate and through the layer 11 and the plate 12a against the abutment 10. In this embodiment it will be apparent that the laminated shim formed by the layer 11 and plates 12 and 12a may be readily removable for replacement purposes.

In the embodiment of FIG. 4 the layer 11 of viscoelastic material is again bonded between opposed steel plates 12 and 12a. However, here the plate 12 is formed of spring steel and is generally U-shaped to have legs 12b by which the laminated shim is clipped to engage opposed side edges of the abutment 10 and firmly retain the shim on the abutment (preferably with the plate 12a in face-to-face abutment with the face 10a). In FIG. 4 the edge of web end 9 is intended to slidingly abut the plate 12 and to react through the layer 11 in the laminate against the abutment 10. It will be realised however that the laminate/clip component may be of a reverse structure whereby the spring legs 12b are arranged to clip on to the web end 9 of the brake shoe so that end 9 will slidingly abut the plate 12a to react through that plate and successively through the viscoelastic layer 11 and the steel plate 12 against the abutment 10.

The visco elastic layer 11 in FIG. 5 is incorporated as part of a laminated spring clip component which is attached to the abutment 10 in a similar manner to the FIG. 4 embodiment. However, in FIG. 5 it will be seen that the laminated clip is formed by two substantially complementary "U" shaped spring steel plates between which is disposed and bonded a "U" shaped layer of the visco elastic material 11. More particularly, the inner of the "U" shaped plates has opposed legs 12b' and a bridging portion 12a', the latter of which abuts the face 10a of the abutment 10 in a similar manner to the plate 12a in FIG. 4.

Although the aforegoing embodiments indicate the visco elastic material as being retained or maintained on a rectangularly shaped abutment anvil or plate 10, it will be appreciated that the abutment is not necessarily in the form of a plate or a rectangular shape.

The vehicle to which the drum brake assembly shown in FIG. 1 is fitted will usually have a direction of movement which results in the drum 1 rotating in the direction of arrow X and under these conditions the brake shoe 2 will be regarded as the leading shoe and the brake shoe 3 as the trailing shoe. Tests have indicated that the provision of the resilient damping material 11 is most beneficial for the leading brake shoe and it is likely that there will be applications of the present invention where it is considered unnecessary to provide the resilient damping material for a trailing brake shoe.

Figure 6:
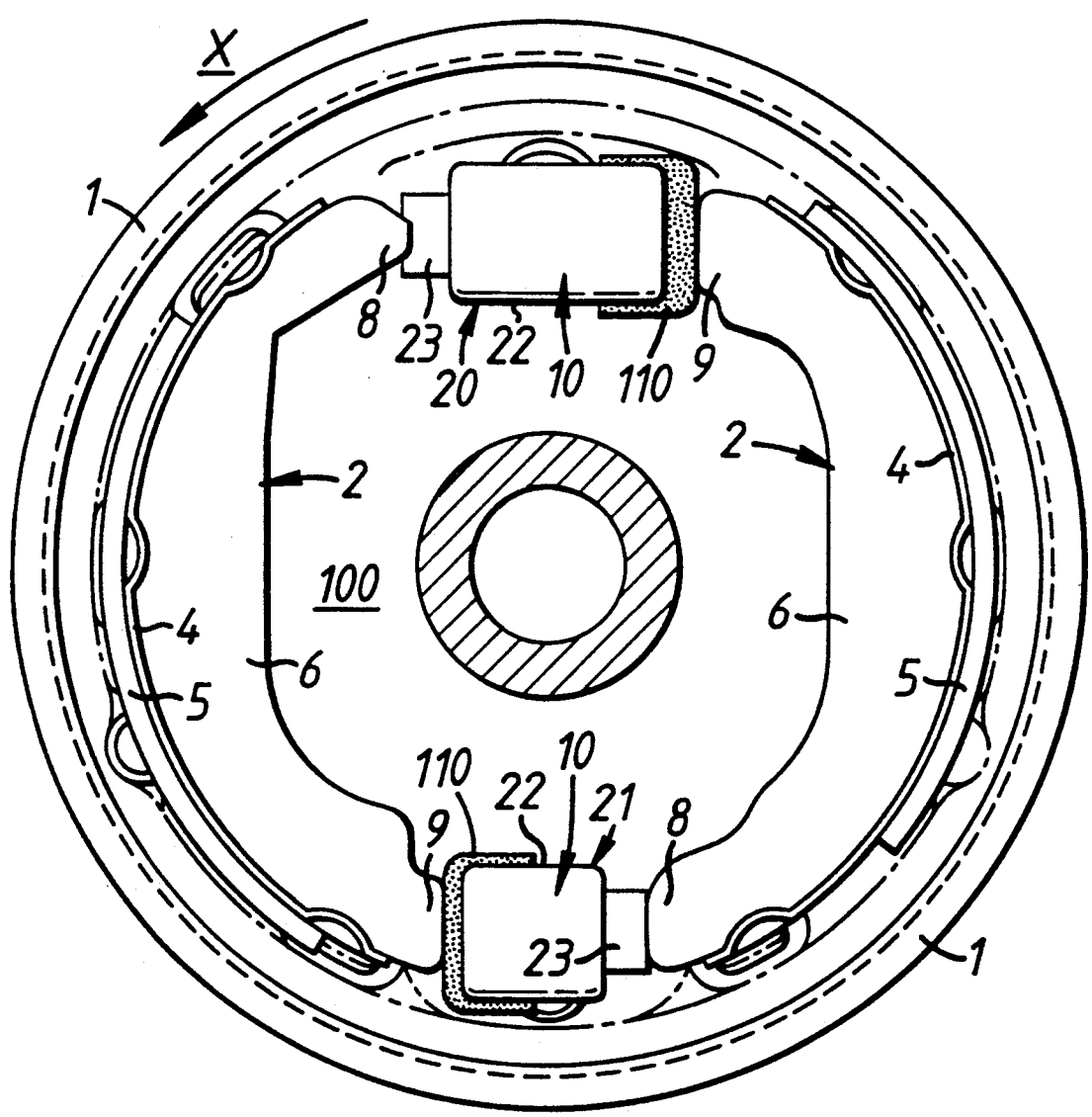

FIG. 6 shows a modified form of drum brake assembly in which the two diametrically opposed brake shoes are mounted within the drum 1 and each of these brake shoes 2 leads with regard to the direction of rotation for the drum indicated by the arrow X. Two hydraulic rams 20 and 21 are provided for displacing, one each, the shoes 2. More particularly, the ram 20 is disposed between the opposed adjacent ends 8 and 9 of the two shoes while the ram 21 is disposed between the opposite adjacent ends 9 and 8 respectively of the shoes. Each ram comprises a cylinder 22 which is secured relative to the back plate 100 and a piston 23 which acts on the ad acent end 8 of the respective shoes 2 so that when the rams are actuated as shown in FIG. 6 the pistons 23 can simultaneously displace the shoes in an anti-clockwise direction in that Figure to brake the drum 1. During such braking and/or actuation of the rams 20 and 21 the free ends 9 of the shoes 2 react against the abutments 10 through the visco elastic damping layer and metal plate laminates 110. Each abutment 10 in FIG. 6 conveniently comprises the cylinder 22 of the ram which is located adjacent to the respective shoe free end 9 while the visco elastic layer and plate laminate may be secured to or carried on the cylinder 22 or on a mounting part for that cylinder in the manner previously discussed with reference to FIGS. 2 to 5.

I claim:

1. A drum brake assembly compising a rotatable brake drum having an interior cylindrical surface; a brake shoe within the drum; actuating means for displacing the shoe into engagement with said cylindrical surface for braking the drum; said shoe having a free end, remote from the actuating means, which reacts during braking against an abutment relative to which the drum is rotatable, a metal plate, interposed between said free end of the brake shoe and said abutment, with which the free end of the shoe is in direct abutting and slidin contact and a resilient damping material interposed between said plate and said abutment and sandwiched between a metallic surface of said metal plate and a further metallic surface and bonded or adhesively secured to at least one of said metallic surfaces to form a laminate therewith, through which resilient damping material said reaction is effected to alleviate noise of operation of the assembly and a clip forming part of said laminate having two opposed legs engaging the brake shoe or the abutment to retain the laminate thereon and having a bridging portion transversely joining said opposed legs and defining said plate, and wherein the clip is integrally formed with the plate to which the damping material is secured.

2. An assembly as claimed in claim 1 in which the actuaying means comprises a fluid prsesure operated ram.

3. An assembly as claimed in claim 1 in which the resilient damping material comprises a layer having a thickness in the range 0.2 to 0.5 millimeters.

4. An assembly as claimed in claim 3 wherein said resilient dampening material comprises a viscoelectric rubber.

5. An assembly as claimed in claim 1 in which the plate has a thickness in the range of 0.2 to 0.5 millimeters.

6. An assembly as claimed in claim 1 in which the brake shoe is of substantially arcuate shape and comprises a part cylindrical platform on the convex side of which platform is carried a friction braking material and on the concave side of which platform is an integral web and wherein one end of the shoe is acted on by said actuating means and the opposit free end of the shoe reacts through th clip against the abutment.

7. An assembly as claimed in claim 6 and having two said brake shoes positioned sustantially diametrically opposite to each other within the drum.

8. An assembly as claimed in claim 7 in which said one ends of the respective shoes are adjacent to each other and said actuating means is disposed between said one ends to act simultaneously on both shoes, said opposite free ends of the respective shoes are adjacent to each other and said abutment is disposed between said opposite ends, and wherein at least one of said opposite free ends of the brake shoe reacts on the abutment through said clip.

9. An assembly as claimed in claim 7 in which said one end of one shoe is adjacent to said opposite free end of the second shoe and said opposite free end of the one shoe is adjacent the one end of the second shoe; said actuating means and a said abutment are disposed between each of said adjacent one end and opposite free end so that both brake shoes can be displaced simultaneosuly by said actuating means acting on said one ends of the respective brake shoes and both brake shoes are leading, and each said opposite free end of the brake shoes reacts on the respective abutments through a sai clip.

10. An assembly as claimed in claim 9 in which each actuating means comprises a fluid pressure operated piston and cylinder device.

11. An assembly as claimed in claim 10 in which the abutments comprise the cylinders of the respective actuating devices.

12. An assembly as claimed in claim 6 wherein said resilien dampening material comprises a viscoelastic rubber.

13. As assembly as claimed in claim 1 wherein said resilient dampeining material comprises a viscoelastic rubber.

* * * * *